United States Patent
Hall et al.

(10) Patent No.: US 11,138,744 B2
(45) Date of Patent: Oct. 5, 2021

(54) MEASURING A PROPERTY OF A TRAJECTORY OF A BALL

(71) Applicant: FORMALYTICS HOLDINGS PTY LTD, West Perth (AU)

(72) Inventors: Andrew Hall, North Fremantle (AU); David Budden, Melbourne (AU); Grant Etherington, Mosman Park (AU); Holly Ade Simpson, Nelson (NZ); Tres Kani, Waipukurau (NZ); Se Yeun Kim, New South Wales (AU)

(73) Assignee: FORMALYTICS HOLDINGS PTY LTD, West Perth (AU)

( * ) Notice: Subject to any disclaimer, the term of this patent is extended or adjusted under 35 U.S.C. 154(b) by 229 days.

(21) Appl. No.: 16/348,715

(22) PCT Filed: Nov. 10, 2017

(86) PCT No.: PCT/AU2017/051236
§ 371 (c)(1),
(2) Date: May 9, 2019

(87) PCT Pub. No.: WO2018/085894
PCT Pub. Date: May 17, 2018

(65) Prior Publication Data
US 2019/0266735 A1    Aug. 29, 2019

(30) Foreign Application Priority Data
Nov. 10, 2016 (AU) .............................. 2016904594

(51) Int. Cl.
G06T 7/254    (2017.01)

(52) U.S. Cl.
CPC .... G06T 7/254 (2017.01); *G06T 2207/10024* (2013.01); *G06T 2207/20076* (2013.01);
(Continued)

(58) Field of Classification Search
CPC . G06T 7/254; G06T 7/20; G06T 2207/10024; G06T 2207/20076; G06T 2207/30224; G06T 2207/30241
See application file for complete search history.

(56) References Cited

U.S. PATENT DOCUMENTS 5,498,000 A * 3/1996 Cuneo .................... A63B 63/06
                                                           273/407
8,077,917 B2   12/2011 Forsgren
(Continued)

FOREIGN PATENT DOCUMENTS

JP    2004097662 A  *  4/2004
WO    2002061684 A2    8/2002

OTHER PUBLICATIONS

Translated Version of JP 2004-097662 (Year: 2004).*
(Continued)

*Primary Examiner* — Carol Wang
(74) *Attorney, Agent, or Firm* — Edell, Shapiro & Finnan LLC

(57) ABSTRACT

A method for determining whether a goal is achieved by a trajectory of a ball using a mobile computer device comprises capturing a sequence of video frames of the ball with a camera of the mobile computer device; detecting the ball in at least three of the video frames; computing a trajectory of the ball using the detections of the ball; detecting a goal image in at least one of the video frames; computing whether the trajectory of the ball achieves intersection or similar with a goal plane computed from the goal image according to a goal criterion.

22 Claims, 6 Drawing Sheets

(52) U.S. Cl.
CPC ............... *G06T 2207/30224* (2013.01); *G06T 2207/30241* (2013.01)

(56) References Cited

U.S. PATENT DOCUMENTS

| | | | |
|---|---|---|---|
| 9,256,957 B1 | 2/2016 | Frey et al. | |
| 9,275,470 B1 | 3/2016 | Forkosh et al. | |
| 2009/0067670 A1* | 3/2009 | Johnson | G06T 7/73 382/100 |
| 2009/0147992 A1 | 6/2009 | Tong et al. | |
| 2010/0210377 A1* | 8/2010 | Lock | A63B 24/0006 473/409 |
| 2011/0305369 A1 | 12/2011 | Bentley et al. | |
| 2013/0120581 A1* | 5/2013 | Daniels | H04N 21/23418 348/157 |
| 2013/0120582 A1* | 5/2013 | Daniels | G06T 5/006 348/157 |
| 2013/0121538 A1* | 5/2013 | Daniels | G06T 7/20 382/107 |
| 2014/0092253 A1* | 4/2014 | Marty | G06T 7/70 348/157 |
| 2014/0285669 A1 | 9/2014 | Lindner et al. | |
| 2014/0300733 A1 | 10/2014 | Mitchell | |
| 2014/0300745 A1 | 10/2014 | Kirk et al. | |
| 2014/0301598 A1 | 10/2014 | Marty et al. | |
| 2016/0212385 A1* | 7/2016 | Ginsberg | G06T 7/246 |
| 2016/0287967 A1* | 10/2016 | Baldwin | A63F 13/428 |
| 2016/0306036 A1* | 10/2016 | Johnson | G01S 13/867 |
| 2016/0350922 A1* | 12/2016 | Tofolo | G06T 7/248 |
| 2018/0137662 A1* | 5/2018 | Simeone | A63C 19/00 |
| 2019/0083875 A1* | 3/2019 | Guerci | A63B 24/0062 |

OTHER PUBLICATIONS

Leo, Marco, Pier Luigi Mazzeo, Massimiliano Nitti, and Paolo Spagnolo. "Accurate ball detection in soccer images using probabilistic analysis of salient regions." Machine vision and applications 24, No. 8 (2013): 1561-1574. (Year: 2013).*

D'Oranzio, et al. "A Ball Detection Algorithm for Real Soccer Image Sequences", 2002, IEEE, 4 pages.

Velammal, et al., "An Efficient Ball Detection Framework for Cricket", International Journal of Computer Science Issues, vol. 7, Issue 3, No. 2, May 2010, pp. 30-35.

Koren, et al., "Estimating Goal-Scoring Probabilities in Soccer, Based on Physical and Geometric Factors", Feb. 2015, 121 pages.

PCT International Preliminary Report Report on Patentability, PCT/AU2017/051236, dated Mar. 4, 2019, 9 pages.

PCT International Search Report and Written Opinion, PCT/AU2017/051236, dated Jan. 19, 2018, 17 pages.

Yu et al., "Trajectory-based ball detection and tracking with application to semantic analysis of broadcast soccer video", Proceedings of the 11th ACM International Conference on Multimedia, Nov. 2, 2003, pp. 11-20.

Farina et al., "Taking the goalkeeper's side in association football penalty kicks", International Journal of Performance Analysis in Sport, vol. 13, No. 1, Apr. 2013, pp. 96-109.

De Sousa et al., "An overview of automatic event detection in soccer matches", Applications of Computer Vision (WACV), 2011 IEEE, Jan. 5, 2011, pp. 31-38.

* cited by examiner

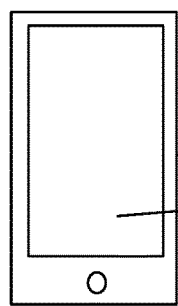
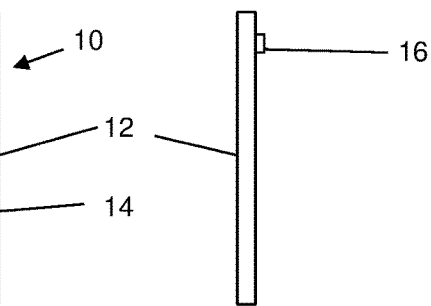
FIG. 1    FIG. 2
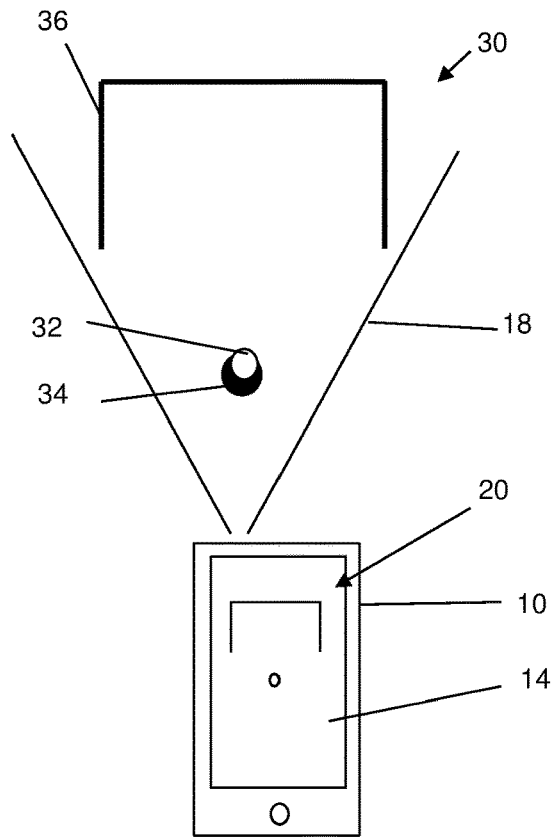
FIG. 3
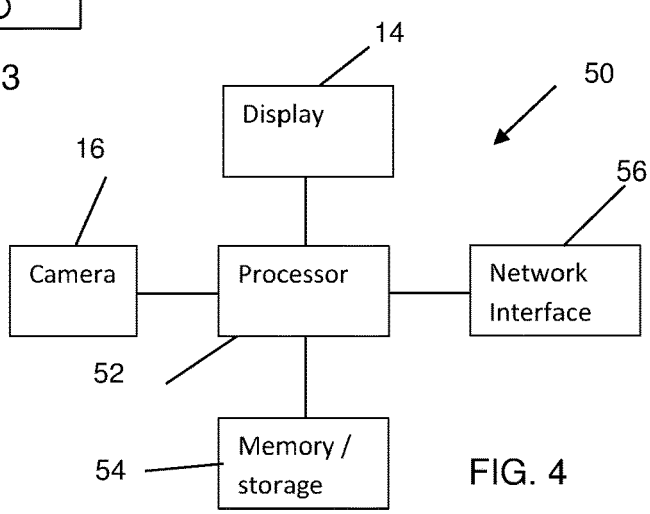
FIG. 4

MEASURING A PROPERTY OF A TRAJECTORY OF A BALL

CROSS REFERENCE TO RELATED APPLICATIONS

This application is a national stage application under 35 U.S.C. § 371 of International Application PCT/AU2017/051236, filed Nov. 10, 2017, entitled "MEASURING A PROPERTY OF A TRAJECTORY OF A BALL", which claims priority to AU Patent Application No. 2016904594, filed Nov. 10, 2016, the entire disclosures of which are incorporated herein by reference.

FIELD OF THE INVENTION

The present invention relates to a method of measuring a property of a trajectory of a ball with a mobile computer device.

BACKGROUND

Mobile computer devices, including smartphones, tablet computers and the like are widely used. Most people now own a smart phone. Commonly, these mobile computing devices have an in-built camera and can be loaded with customised software, commonly referred to as an App.

Sports are a common pass time and a source of competition between players, not just during the playing of a sports game, but on how well a player's skills compare with another player. Association football, also known as soccer, is a type of football widely played around the world. Players of soccer, even on the same team, will often be competitive about how accurate they can kick the soccer ball, how fast they can kick or how well they can deceive a goalkeeper into thinking they are kicking to one side of the goals, but in actuality kick to the other side of the goals.

The present invention relates to ball games such as soccer, tennis, table tennis, basketball, baseball or golf, and using a mobile computer device to determine a property of a kicked, batted or thrown ball. The present invention also relates to use of the mobile computing device to determine if a goal is achieved.

US Patent Application 20140300733 focuses on detecting the speed of the ball from a side view. While useful for some sports, the side view tracking of a ball is not useful in others.

US Patent Application 20140300745 again focuses on detecting the speed of the ball between two time spaced frames, by measuring distance travelled by the ball over the time to determine the speed.

U.S. Pat. No. 9,275,470 tracks a ball by tracking the image on the ball.

US Patent Application 20140301598 focuses on tracking a ball based on detecting the ball in 2D pixel space, converting the detected ball into 3D space and then determining a characteristic of the ball. However, this does not account for false positive detections of the ball.

A reference to a prior art document is not intended to be an admission that such a prior art document forms part of the common general knowledge of a person skilled in the art of the invention in any jurisdiction.

In this specification the terms "comprising" or "comprises" are used inclusively and not exclusively or exhaustively.

SUMMARY OF THE INVENTION

According to an aspect of the present invention there is provided a method for determining a property of a trajectory of a ball with a mobile computer device, comprising:

capturing a sequence of video frames of the ball with a camera of the mobile computer device;

finding candidates of the ball in at least three of the video frames; eliminating false positive detections of the ball, comprising fitting ball candidates to a curve trajectory in which ball candidates not sufficiently representing the curve trajectory are eliminated as ball candidates;

computing a property of the trajectory of the ball using travel of the ball through the curve trajectory.

In an embodiment the eliminating step comprises eliminating outlier candidates of the ball, leaving remaining candidate balls to which the fitting occurs. In an embodiment eliminating outlier candidate balls comprises conducting a random sample consensus iterative analysis across the at least three frames to eliminate unlikely candidates of the position of the ball in the frames. In an embodiment the eliminating step comprises eliminating ball candidates that do not have an appropriate sequential change in the size of a circle fitted to the perimeter of the found ball candidates.

In an embodiment the curve is fitted to candidates of the ball for video frames in which the ball is determined to be moving.

In an embodiment the method further comprises identifying a reference object in the video frames. Preferably the mobile computing device is stationary, so that the reference object is stationary in the video images. In an embodiment the reference object is a soccer goal. In an embodiment the type of reference object is predetermined according to the type of sport in which the ball is used. For example, if a soccer goal is identified then a soccer ball is sought to be identified, however if a basketball ring is identified then a basketball is sought to be identified.

In an embodiment the fitting step comprises finding a centre of each candidate ball as a 2-dimensional coordinate in pixel space.

In an embodiment the fitting step comprises converting the centre of each candidate ball into a 3 dimensional coordinate in space.

In an embodiment the fitting step comprises fitting a quadratic curve to at least one cardinal plane through the 3 dimensional coordinate space. In an embodiment the fitting step comprises fitting a quadratic curve to each of the three cardinal planes through the 3 dimensional coordinate space.

In an embodiment the fitting of the trajectory curve comprises constraining movement of the ball through the vertical planes according to acceleration due to gravity.

In an embodiment the camera is positioned substantially rearward of the direction of travel of the ball.

In an embodiment finding ball candidates comprises converting each of the at least three video frames into greyscale. In an embodiment finding ball candidates comprises determining a difference image between consecutive ones of the at least three video frames. In an embodiment finding ball candidates comprises converting the difference images into a binary image. In an embodiment finding ball candidates comprises applying a function to remove groups of adjacent pixels in each of the at least three video frames that are too small. In an embodiment finding ball candidates comprises applying a function to remove groups of adjacent pixels in each of the at least three video frames that are too big. In an embodiment finding ball candidates comprises calculating a gradient vector field. In an embodiment finding ball candidates comprises shape matching. In an embodiment the shape matching comprises checking that the gradient direction in the gradient vector field is a smooth circle. In an embodiment the shape matching comprises applying a Hough transform.

In an embodiment finding ball candidates comprises eliminating ball candidates outside of an area of interest.

In an embodiment the method further comprises computing whether the trajectory of the ball achieves intersection or similar with a goal image in the video frames according to a goal criterion.

In an embodiment the property computed comprises one or more of:

The speed of the ball
The force with which the ball was kicked
The angle at which the ball was kicked
The flight time and distance of the ball
The spin asserted on the ball According to an aspect of the present invention there is provided a method for determining whether a goal is achieved by a trajectory of a ball using a mobile computer device, comprising:

capturing a sequence of video frames of the ball with a camera of the mobile computer device;
detecting the ball in at least three of the video frames;
computing a trajectory of the ball using the detections of the ball; detecting a goal image in at least one of the video frames;
computing whether the trajectory of the ball achieves intersection or similar with a goal plane computed from the goal image according to a goal criterion.

In an embodiment detecting the goal image comprises determining the position of a goal in the at least one of the video images. In an embodiment computing the goal plane comprises determining a plane in 3 dimensional space which coincides with the position of the goal in the at least one of the video images. In an embodiment detecting the goal image comprises defining a shape of the goal in the determined plane. In an embodiment computing the trajectory of the ball comprises fitting a curve to the detected ball in the at least three video frames. In an embodiment computing whether the trajectory of the ball achieves intersection or similar with the goal image comprises computing whether the curve fitted to the trajectory of the ball intersects with the inside of the defined shape.

In an embodiment the goal criterion comprises one or more of achieving a minimum speed of the ball; achieving placement of the ball in a particular position in the goal image; achieving a particular spin on the ball.

In an embodiment the goal criterion comprises a difficulty input.

In an embodiment the goal criterion determines whether the kick of the ball would be a goal or not according to the difficulty input.

In an embodiment the goal plane is mapped to a probability density.

In an embodiment the probability density is determined by characteristics assigned to a virtual goalkeeper. A virtual goalkeeper may be a generic goalkeeper, or a personality goalkeeper. In an embodiment the characteristics comprise height, arm span, speed and reaction time. In an embodiment the goal plane is mapped to a probability density according to an equation of a curve derived from the characteristics of height and arm span.

In an embodiment a probability is selected form the probability density according to the placement of the ball. Placement is determined by position of crossing the goal plane. In an embodiment the selected probability density is modified according to characteristics of the kick, such as for example ball speed and path deviation. Path deviation is determined by ball spin.

The method may be performed on a mobile computer device, such as a smartphone, tablet computer or mobile media player.

The method steps can, for example, be performed by a computer program (such as an app) installed on the mobile computer device. Alternatively, the mobile computer device may be equipped with the claimed functionality.

The method can use the camera of the mobile computer device to take a sequence of video frames of, for example, a kick of a soccer ball. It is contemplated to use the method with other ball sports such as tennis, golf, table tennis, football, basketball, baseball and the like. Also, instead of a kick, the ball may be batted, for example, as a tennis ball is hit; or thrown, for example, as a basketball is thrown.

The sequence of video frames may be taken directly by use of the app, which performs the method steps. Alternatively the sequence may be taken with a default video application of the mobile computer device, stored in a memory of the mobile computer device and subsequently provided to an app for analysis.

One or more parts of the finding, fitting, detecting, or computing steps may be performed on a computing device remote from the mobile computing device under the control of the mobile computing device.

Some of the ball detection techniques described in US 20140300745 and/or US 20140301598 may be used, the contents of both is incorporated herein by reference.

According to a further aspect of the present invention there is a mobile computer device configured to perform a method described herein.

According to a still further aspect of the present invention there is a computer program which comprises instructions for controlling a processor and a camera of a mobile computer device to perform a method described herein.

BRIEF DESCRIPTION OF THE DRAWINGS

Embodiments of the present invention are described in the following detailed description by example only, with reference to the following drawings:

FIG. 1: is a front view of an example mobile computer device on which embodiments of the present invention may be implemented.

FIG. 2: is a side view of the mobile computer device of FIG. 1.

FIG. 3: is a schematic representation of the beginning of recording a sequence of video frames of a kick to a ball towards a soccer goal.

FIG. 4: is a schematic block diagram of components of the mobile computing device of FIG. 1.

DETAILED DESCRIPTION OF THE INVENTION

Figure 5:
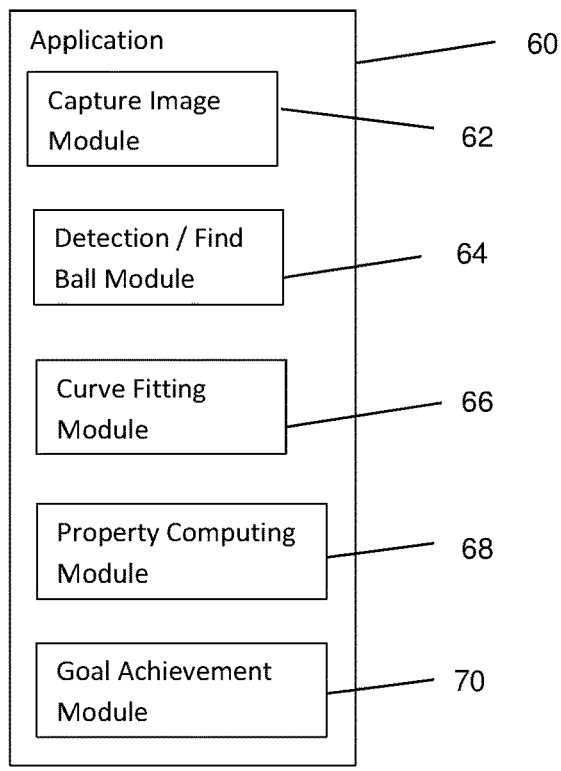
FIG. 5: is a schematic block diagram of an application for execution on the mobile computing device.

FIGS. 1 and 2 show a typical mobile computing device in the form of a smart phone 10, such as an iPhone™ by Apple Computers, or an Android™ based phone. It comprises a body 12, a screen 14 for display and touch input, and a camera 16. Typically the camera 16 is on the opposite side to the screen 14. This allows the camera 16 to be pointed at a scene 30 of interest and the screen 14 to be directed so that an image 20 of the scene 30 can be seen on the screen 14.

FIG. 3 shows a scene 30 in which there is a ball 32 positioned in a penalty spot 34 ready to be kicked at a goal 36. The scene 30 is captured by the camera 16, which has a field of view 18, and may be shown in the image 20 on the screen 14 and/or recorded. It can be seen that mobile computer device 10, and thus the camera 16 is positioned substantially rearward of the direction of travel of the ball. This is preferred, but need not be the case.

Referring to FIG. 4, the mobile computing device 10 comprises electronic components 50 which comprise a processor 52, the camera 16, a memory/non-volatile storage 54, the display 14 and a network interface 56, which is typically a cellular telephone network interface and/or a WiFi interface and/or a Bluetooth interface.

The memory 54 stores a computer program, also referred to as an application 60 or app for short. The app comprises instructions, which when executed by the processor 52, control the mobile computing device 10. The instructions may be in the form of firmware, or electronic circuitry. The app 60 is stored in a non-volatile, non-transitory manner.

The app 60 may be structured to configure the processor into a number of functional modules, comprising a capture image module 62, a detection/find ball module 64, a curve fitting module 66, a property computing module 68 and a goal achievement module 70.

Figure 6:
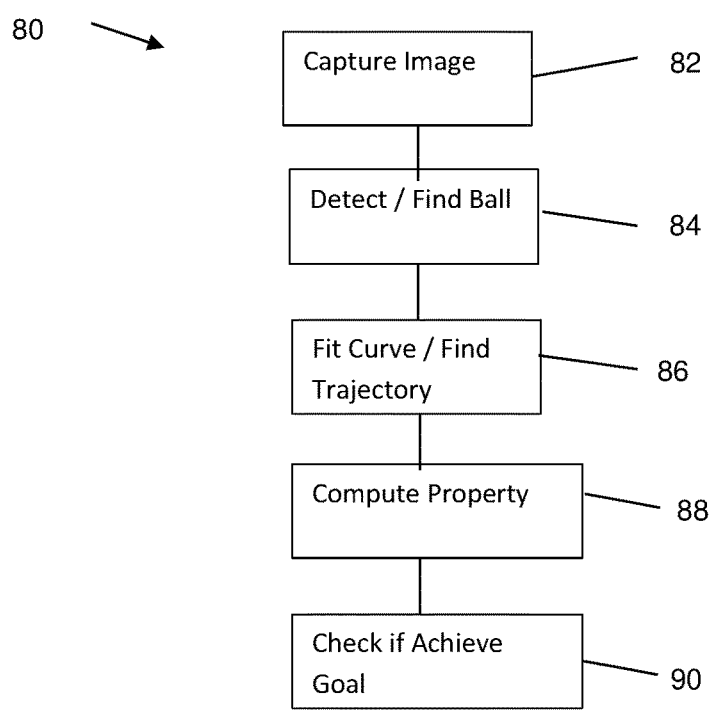
FIG. 6: is a flow chart of a method of an embodiment of the present invention.

FIG. 6 shows a flow chart of an embodiment of a method 80 of the present invention. The method 80 comprises:
using the capture image module 62 to capture 82 a sequence of video frames of the ball with a camera of the mobile computer device;
using the detection/find ball module 64 to find 84 candidates of the ball in at least three of the video frames;
using the curve fitting module 66 to fit 86, or otherwise determine a three dimensional trajectory curve to the candidates of the ball;
using the property computing module 68 to compute 88 a property of the trajectory of the ball using travel of the ball through the curve.

In an embodiment the method further comprises using the goal achievement module 70 to check 90 if a goal is achieved.

The capture 82 of the video frames by the capture image module 62 occurs in the normal manner. That is, the camera 16 takes a sequence of images. For example, this may be at 30 frames per second or higher. The images are stored in the memory 54.

The find ball step 84 uses at least three of the stored video frames.

This process takes place frame-by-frame. The video frames are analysed to find candidate balls in the video frames and to output a list of potential ball candidates encoded by their pixel coordinate and radius, {x, y, r}.

In an embodiment a known number of frames of the captured sequence of video frames are skipped to determine consecutive ones of the at least three video frames. In an embodiment the video frames used start when the ball is begins moving. There may be a preliminary step to find the ball and then do the analysis of the movement of the ball once it begins moving. In an embodiment detection of when the ball begins moving occurs by detection of a further event. In an embodiment detection of the further event is the player kicking, striking, batting or throwing the ball (or otherwise moving it). In an embodiment a sound of kicking etc. the ball is detected to determine a time window for determining the ball is moving. In an embodiment a visual cue is detected to determine a time window for determining the ball is moving. In an embodiment a large movement in the scene is analyzed to determine a time window for determining the ball is moving.

In an embodiment finding ball candidates comprises converting each of the at least three video frames into greyscale by extracting the intensity channel (disregarding chroma), so each pixel is a value in the range [0, 255].

In an embodiment finding ball candidates comprises determining a difference image between consecutive ones of the at least three video frames.

In an embodiment finding ball candidates comprises converting the difference images into a binary image by applying an intensity filter, i.e. pixels above some threshold value are assigned "white" (true, 1) and the rest assigned "black" (false, 0). Groups ("blobs") of adjacent white pixels are considered candidates.

In an embodiment finding ball candidates comprises applying a function to remove groups of adjacent pixels in each of the at least three video frames that are too small by applying a dilution (minimize) function. In an embodiment finding ball candidates comprises applying a dilation (maximize) function to undo the dilution function.

In an embodiment finding ball candidates comprises calculating a gradient vector field. In an embodiment finding ball candidates comprises shape matching. In an embodiment the shape matching comprises checking that the gradient direction in the gradient vector field is a smooth circle. In an embodiment the shape matching comprises applying a Hough transform.

In an embodiment finding ball candidates comprises eliminating ball candidates outside of an area of interest, such as to ensure the ball is only where we expect the ball to be. In an embodiment the ball finding step may comprises fitting ball candidates to a curve trajectory in 2D space.

Figure 7:
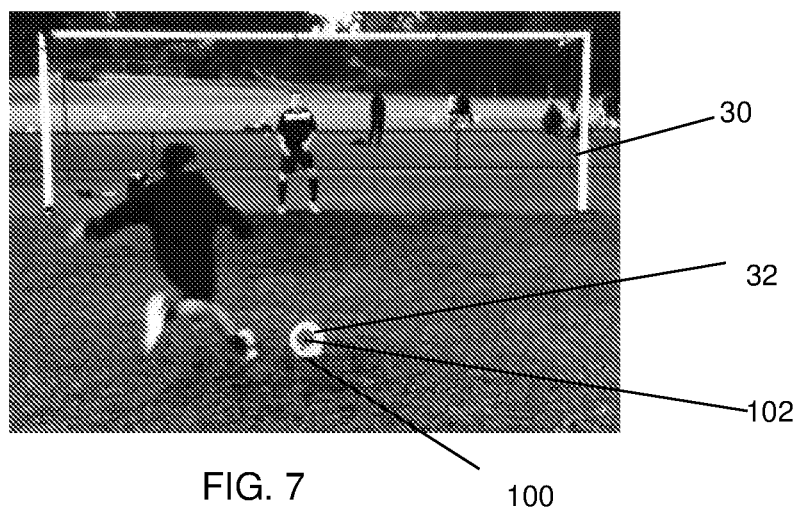
FIG. 7: is an example of a screen view on the mobile computing device of FIG. 1 in which the ball is identified before being kicked.

FIG. 7 shows the ball candidate 100 production in the image. The centre is indicated by 102.

Figure 8:
FIG. 8: is an example of a screen view on the mobile computing device of FIG. 1 in which the ball has been kicked showing a schematic representation of detected instances of the trajectory of the ball.

In FIG. 8 the path of the ball 110 as determined by the sequence of ball candidates is schematically shown.

The fit curve step 86 used the filtered list of {x, y, r} ball candidates, frame-by-frame to find a ball trajectory curve from non eliminated ball candidates. Techniques for finding the ball trajectory curve may comprise fitting the non eliminated ball candidates to a curve. Alternatively the ball trajectory determining technique may comprise growing a trajectory curve from sequence of predictions based on previously found ball candidates that follow a plausible trajectory and choosing the best path (for example, the longest path). The output is a smooth trajectory curve capturing the ball trajectory through time and 3D space. The curve may be in the form of parameterized curve formula.

In an embodiment the fitting step comprises finding a centre of each candidate ball as a 2-dimensional coordinate in pixel space.

In an embodiment the fitting step comprises converting the centre of each candidate ball into a 3 dimensional coordinate in space.

An embodiment this involves the following steps:

a. Extract camera calibration data specific to device, e.g. focal length $\{x, y\}$ and focal center $\{x, y\}$ b. Extract camera distortion coefficients, if necessary c. Apply computer vision (similar to Ball Detection described above except that the based points and corners are detected for a soccer goal) to locate a reference object, such as goalposts. These serve as a known position in 3D space when the reference object is of a known size (for instance a standard soccer goal is 24 ft by 8 ft (7.32 m×2.44 m) and the width of the posts is up to 5 inches (12 cm)).

d. Use the data collected in (a-c) with a pinhole camera model to determine calibration parameters, e.g. 3D orientation, rotation and translation vectors e. Transform each $\{x, y, z\}$ coordinate by the inverse of the vectors in (d) to obtain their 3D $\{X, Y, Z\}$ coordinate In an embodiment the fitting step comprises fitting a quadratic curve to at least one cardinal plane through the 3 dimensional coordinate space. In an embodiment the fitting step comprises fitting a quadratic curve to each of the three cardinal planes through the 3 dimensional coordinate space. A quadratic curve (i.e. of the form $f(x)=Ax^2+Bx+C$) is fitted to each of the three 2D planes: $\{X, Z\}$ and $\{Y, Z\}$ (to model gravity) and $\{X, Y\}$ (to model spin). Different functions of the curve are also envisaged, such as higher order functions.

In an embodiment the fitting of each quadratic curve comprises using a least-squares regression technique.

In an embodiment the fitting of each quadratic curve comprises using the random sample consensus iterative analysis technique.

In an embodiment the fitting of the quadratic curve through the vertical planes (having a Z-axis) comprises using acceleration due to gravity as a constraint ($-9.8$ ms$^{-2}$ along the Z axis) constraint to reduce the degrees-of-freedom in the model.

In an embodiment the fitting of each quadratic curve comprises using the frame number in the sequence at the variable in each curve function.

The frame number associated with each original $\{x, y, r\}$ coordinate is used to determine exactly where along this curve the ball was at each time-step, allowing the 3D flight path of the ball to be stored, transmitted, assessed or replayed.

In an embodiment the curve is fitted to candidates of the ball for video frames in which the ball is determined to be moving.

Figure 9:
FIG. 9: is an example of a screen view on the mobile computing device of FIG. 1 in which the trajectory of FIG. 8 is shown along with a curve fitted to the detected trajectory of the ball.

The computed ball trajectory curve 104 is shown schematically in FIG. 9.

The compute property step 88 uses the 3D parameterized curve to calculate the following statistics from simple Newtonian mechanics:

The speed of the ball (and the force with which it was kicked)
The angle at which the ball was kicked
The flight time and distance of the ball
The spin asserted on the ball (RPM)

Because goal posts of a given type are of a standardized width, we can also calculate the point of intersection between the ball and the goal plane. This can be combined with an artificial profile of a goalkeeper's skills (i.e. how likely they are to save at various parts of the goals) to determine a goal or no-goal.

Using the check of the goal achieved module 90, a reference object is identified in the video frames. In an embodiment the reference object is a soccer goal. In an embodiment the type of reference object is predetermined according to the type of sport in which the ball is used.

Figure 14:
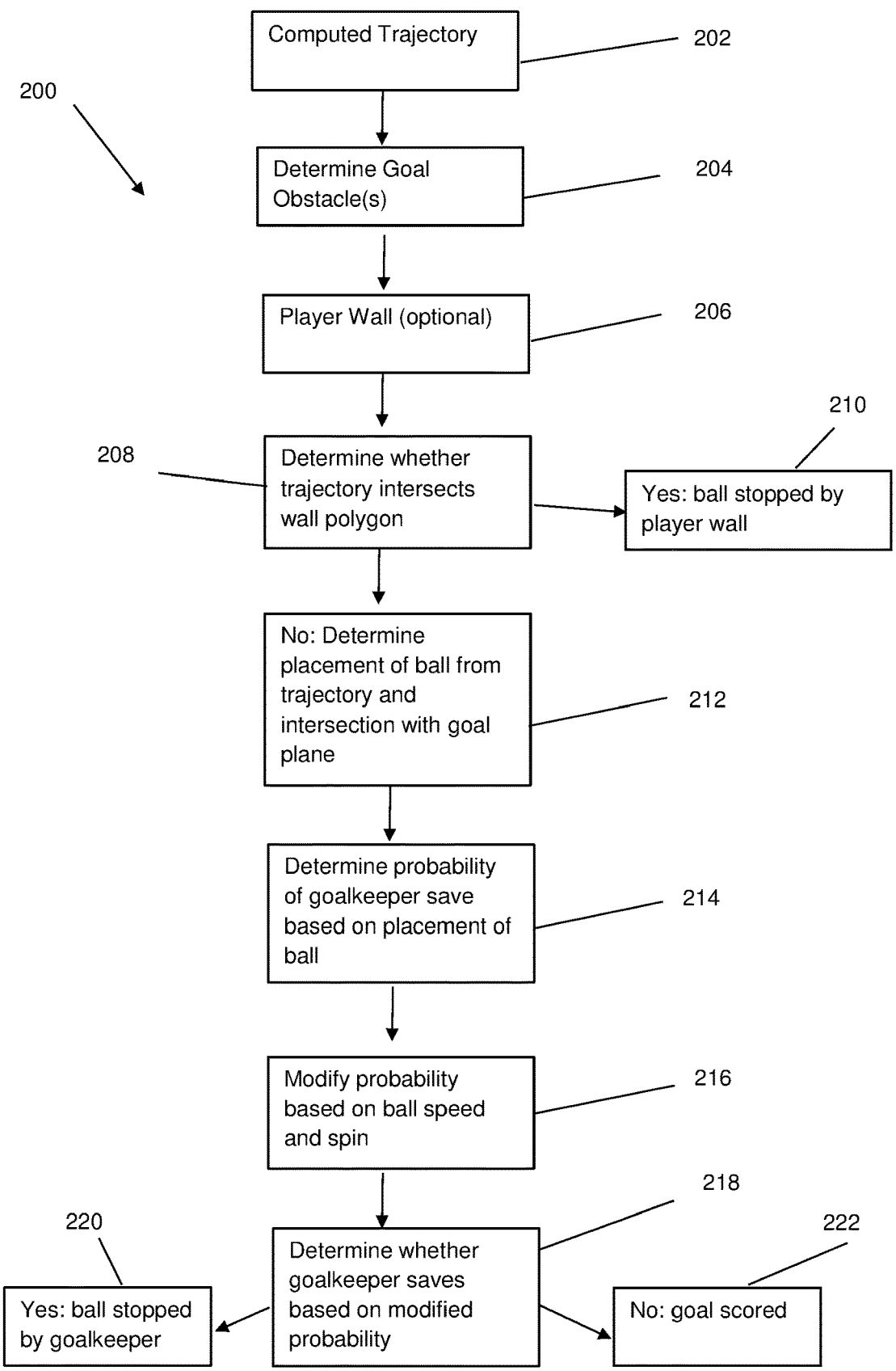
FIG. 14: is a flow chart of a method of determining whether a goal criteria is met.

With reference to FIG. 14, in an embodiment, a method 200 of determining whether a goal criterion is met comprises computing whether the trajectory of the ball achieves intersection 120 or similar with a goal image in the video frames according to a goal criterion. In an embodiment the trajectory accounts for the diameter of the ball. In an embodiment the trajectory accounts for deflection due to hitting a goalpost or cross bar.

The method commences with the trajectory of the ball computed 202, such as by the method described above. Functionality to defeat an obstacle can be selected at 204, as well as the nature of the goalkeeper 140 (generic or personality).

Figure 13:
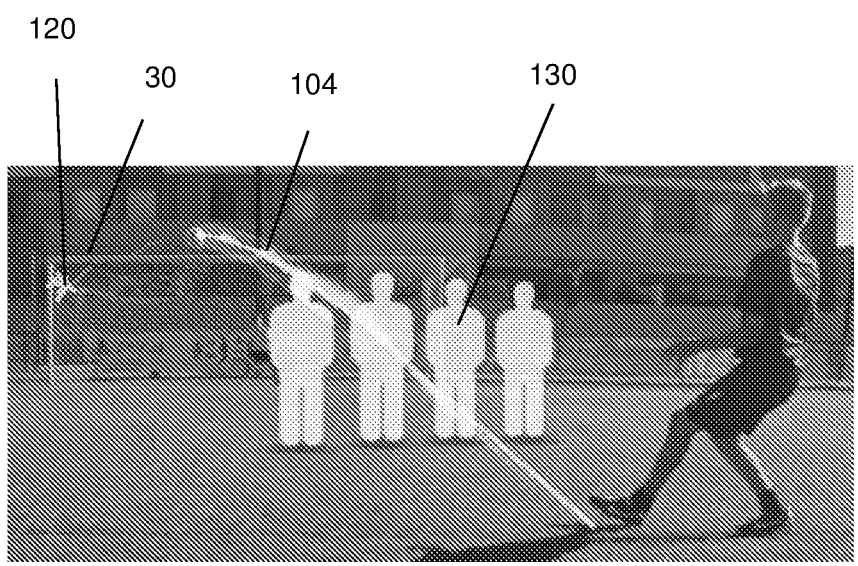
FIG. 13: is a schematic diagram depicting defeating an obstacle (in this example a player wall).

In an embodiment the goal criterion comprises the ball having a trajectory curve that also does not intersect with an obstacle, such as a player wall polygon/polyhedron 130, such as shown by way of example in FIG. 13, at step 208. In an embodiment the player wall polygon/polyhedron is of a given size and is placed in a line between the ball kick start position and the centre of the goal. If the ball trajectory intersects 210 the obstacle then the kick is not considered to be a goal. Otherwise the trajectory is tested against the next obstacle, which in this example is the goalkeeper 140.

In an embodiment the goal criterion comprises the ball having a trajectory curve that is inside of the goal area in the goal plane, but outside of a goalkeeper reach area in the goal plane. In an embodiment the goal criterion comprises a difficulty input. In an embodiment the goal criterion determines whether the kick of the ball would be a goal or not according to the difficulty input. A probability of saving a goal by a generic player or a selectable famous player (a personality goalkeeper) can be calculated to determine whether a goal is achieved or not. In an embodiment the goal criterion is met when the ball has characteristics that defeat the determined difficulty.

In an embodiment the goal criterion is met when the ball has characteristics in combination with a randomization ("dice roll") that defeat a plurality of difficulties based on the determined difficulty. The randomising element simulates the individual goal saving effort on each occasion that the ball is kicked at the goals. The plurality of difficulties simulate that a better placed ball will be more likely to defeat the goalkeeper than a worse placed ball.

In an embodiment the plurality of difficulties is determined by mapping the goal plane to a probability density. In an embodiment the probability density is determined by applying a function to the goalkeeper attributes. In an embodiment the goalkeeper attributes are generic, alternatively the goalkeeper attributes are determined by selection of a personality goalkeeper. In an embodiment the attributes comprise: height (to the shoulder), arm span, speed, and reaction time.

In an embodiment the goal area is divided into subsections. The goalkeeper is assumed to have their feet on the ground in the middle of the goal line. In one embodiment the subsections are determined by parabolically shaped arcs within the goal area. For example, let:

Goalkeeper's position be: (x1, y1)
Arm length: a
Height from ground to shoulders: s
Displacement (distance of a given region from the original region, with the initial region closes to the goalkeeper being k=0): k The equation for a parabolic equation relative to the origin of the goalpost will be:

$$y=-y1+a-k(a-k)2*(x-x1)2+y1+a+s$$

Figure 11:
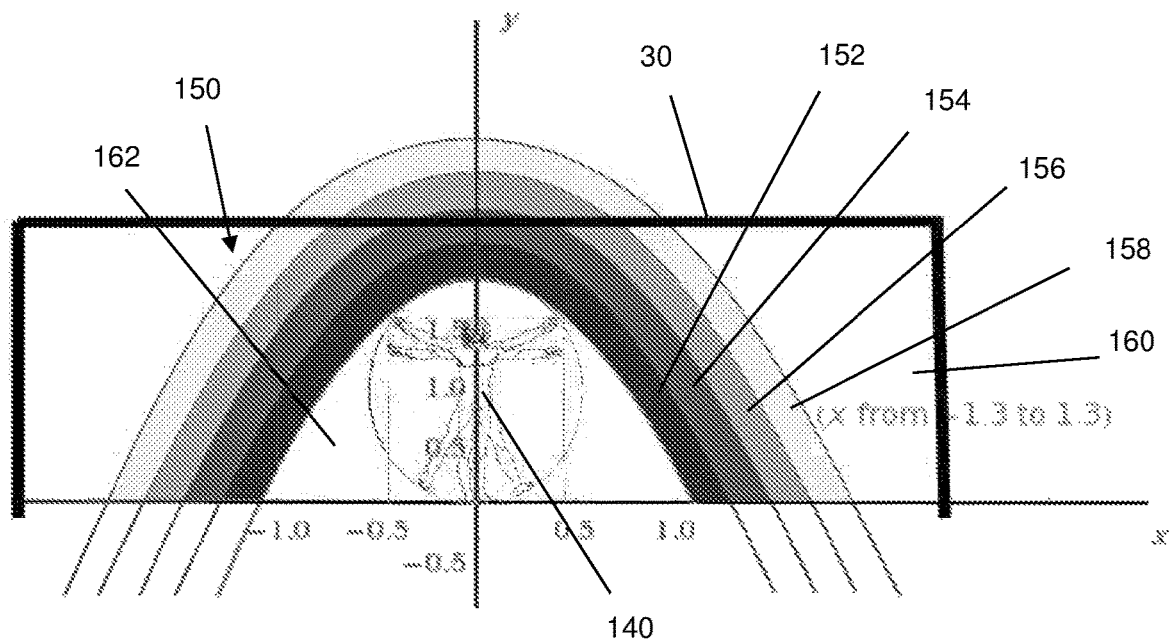
FIG. 11: is a schematic diagram of a first type of probability distribution applied to a goal area.

This is depicted in FIG. 11 with differing values of k dividing the goal area into several regions of probability density 150. Region 162 has the highest probability, for example 90%. Region 152 is for example 80%, region 154 is for example 60%. Region 156 is for example 40%. Region 158 is for example 20%. Region 160 is the lowest probability, for example 5%.

In an alternative embodiment the regions are divided by a semi-circle function to plot the boundaries that define different subsections. The equation for the semi-circle division will be:

$$y=y1+(r+k)2-(x-x1)2$$

Figure 12:
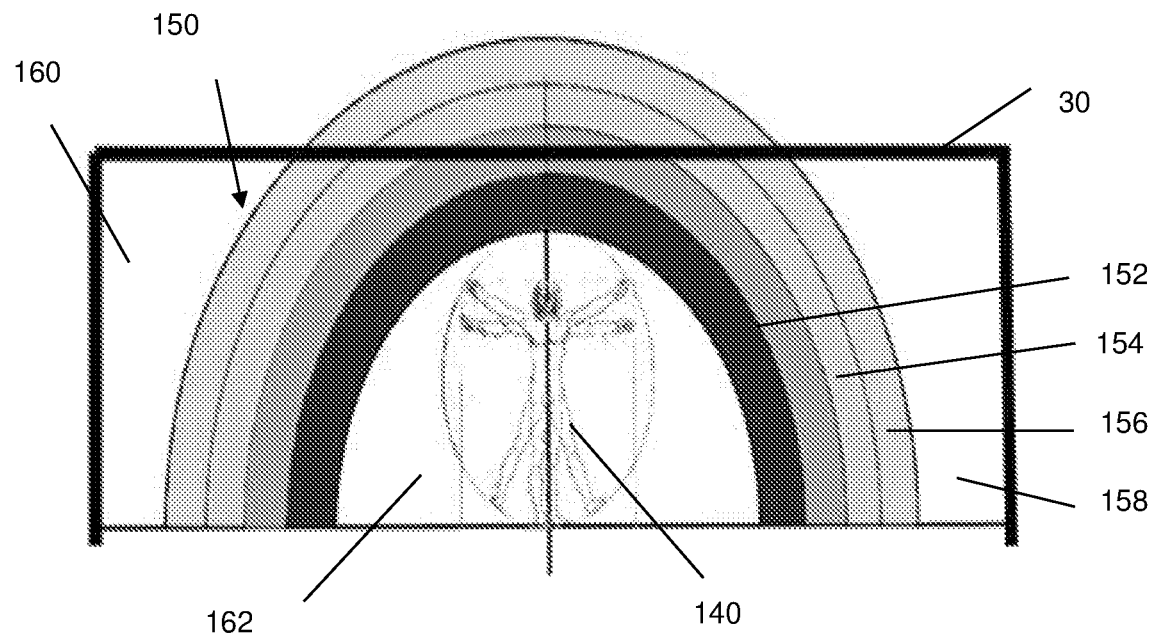
FIG. 12: is a schematic diagram of a second type of probability distribution applied to a goal area.

This is depicted in FIG. 12 wither differing values of k dividing the goal area into several regions of probability density 150.

In an embodiment the ball kicked will have the following characteristics determined from the trajectory:
Ball Speed
Path Deviation (spin)
Placement In an embodiment these values are combined to form a "chance of goal" according to the placement (that is the intersection of the trajectory with the goal plane, that is a probability density. The placement is determined at 212. The point of intersection determines the region.

The region in which the ball intersects the ball plane (that is where the ball is placed), determines a chance of defeating the goalkeeper, as step 214. This chance is modified 216 by the speed of the ball and by the path deviation.

For example, each one hundred of a meter/s of ball speed either side of a base number, say for example 15 m/s, adds/subtracts 1% to the probability. For example, each tenth of a degree of horizontal defection adds 1% to the probability, or each rpm pf spin over a base number of say 10 varies the probability.

The resulting chance is then attempted to be met by a random number produced by a random number generator at 216. If met, the goalkeeper is defeated and a goal scores 222, if not met the goal keeper saves the goal 220.

Figure 10:
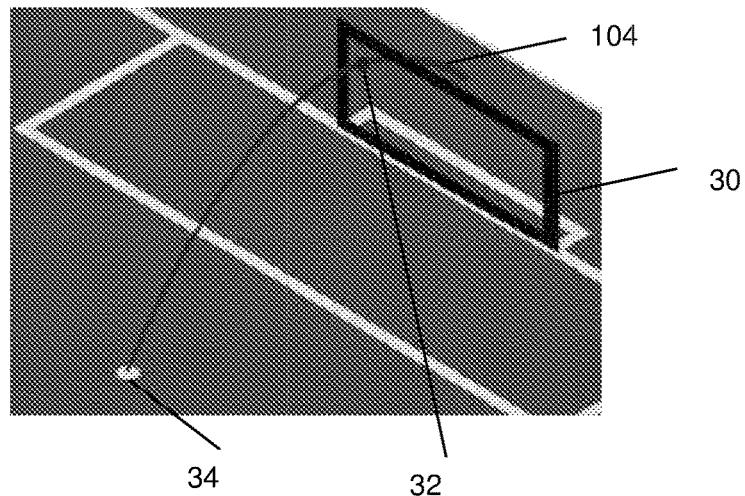
FIG. 10: is a schematic representation of a computer generated recreation of the kick of the ball.

The kick can be shown from an upper isometric view as shown in FIG. 10. The kick can be analyzed a given (selectable) point in the travel along the trajectory curve to determine one or more properties of the ball.

Modifications may be made to the present invention within the context of that described and shown in the drawings. Such modifications are intended to form part of the invention described in this specification.

The invention claimed is:

1. A method for determining an indication of whether a goal is achieved by a trajectory of a ball using a mobile computer device, comprising:
    capturing a sequence of video frames of the ball with a camera of the mobile computer device;
    detecting the ball in at least three of the video frames;
    computing a computed trajectory of the ball using the detections of the ball;
    detecting a goal structure image in at least one of the video frames; and
    computing whether the computed trajectory of the ball achieves intersection with a goal plane computed from the goal structure image according to a goal criterion, wherein the goal plane is mapped to a probability density.

2. A method according to claim 1, wherein detecting the goal structure image comprises determining a position of the goal structure image in at least one of the video frames.

3. A method according to claim 1, wherein computing whether the computed trajectory of the ball achieves intersection with the goal structure image comprises computing whether a curve fitted to the computed trajectory of the ball intersects with an inside of a defined shape.

4. A method according to claim 1, wherein the goal criterion comprises two or more of achieving a minimum speed of the ball, achieving placement of the ball in a particular position in the goal structure image, or achieving a particular spin on the ball.

5. A method according to claim 1, wherein the goal criterion comprises a difficulty input, wherein the goal criterion is defeating a virtual obstacle to score a goal, and the difficulty input is a difficulty of defeating the virtual obstacle, wherein the goal criterion determines whether a kick of the ball would be a goal or not according to the difficulty input.

6. A method according to claim 1, wherein the computed trajectory of the ball is a curved 3D flight path of the ball.

7. A method according to claim 1, wherein the probability density is determined by characteristics assigned to a virtual goalkeeper.

8. A method according to claim 1, wherein the goal plane is mapped to a probability density according to an equation of a curve derived from the characteristics of height and arm span of a goalkeeper.

9. A method according to claim 1, wherein a probability is selected from the probability density according to a placement intersection of the ball with the goal plane.

10. A method according to claim 9, wherein the selected probability density is modified according to characteristics of a kick.

11. A method according to claim 1, wherein a position of the camera is spaced from a goal structure and the goal structure is in a field of view of the camera and wherein the position of the camera is such that the ball moves away from the camera.

12. A method according to claim 1, wherein the probability density is modified according to a speed of the ball to determine a probability representing a chance of achieving a goal.

13. A method for determining a property of a trajectory of a ball with a mobile computer device, comprising:
    capturing a sequence of video frames of the ball with a camera of the mobile computer device;
    finding candidates of the ball in at least three of the video frames;
    eliminating false positive detections of the ball, comprising fitting ball candidates to a curve trajectory in which ball candidates not sufficiently representing the curve trajectory are eliminated as ball candidates; and
    computing a property of the trajectory of the ball using travel of the ball through the curve trajectory;
    wherein the eliminating false positive detections of the ball comprises eliminating outlier candidates of the ball, and leaving remaining ball candidates to which the fitting occurs, and wherein eliminating outlier candidates of the ball comprises eliminating ball candidates that do not have an appropriate sequential change in size of a circle fitted to a perimeter of found ball candidates.

14. A method according to claim 13, wherein the curve trajectory is fitted to candidates of the ball for video frames in which the ball is determined to be moving.

15. A method according to claim 13, wherein the method further comprises identifying a reference object in the video frames.

16. A method according to claim 13, wherein finding ball candidates comprises calculating a gradient vector field.

17. A method according to claim 16, wherein finding ball candidates comprises checking that a gradient direction in the gradient vector field is a smooth circle.

18. A method according to claim 13, wherein the method further comprises computing a position of a goal structure in one or more of the video frames, and computing whether the trajectory of the ball achieves intersection with the computed position of the goal structure in the video frames according to a goal criterion.

19. A method according to claim 13, wherein the property of the trajectory of the ball computed comprises:
force with which the ball was kicked; and
spin asserted on the ball.

20. A mobile computer device configured to perform the method of claim 13.

21. A mobile computer device configured to determine an indication of whether a goal is achieved by a trajectory of a ball, said mobile computer device comprising:
a camera for capturing a sequence of video frames of the ball;
a processor module configured to detect the ball in at least three of the video frames;
a processor module configured to compute a computed trajectory of the ball using the detections of the ball;
a processor module configured to detect a goal image in at least one of the video frames; and
a processor module configured to compute whether the computed trajectory of the ball achieves intersection with a goal plane computed from the goal structure image according to a goal criterion, wherein the goal plane is mapped to a probability density.

22. A mobile computer device configured to determine a property of a trajectory of a ball, said mobile computer device comprising:
a camera for capturing a sequence of video frames of the ball;
a processor module configured to find candidates of the ball in at least three of the video frames;
a processor module configured to eliminate false positive detections of the ball, comprising fitting ball candidates to a curve trajectory in which ball candidates not sufficiently representing the curve trajectory are eliminated as ball candidates; and
a processor module configured to compute a property of the trajectory of the ball using travel of the ball through the curve trajectory;
wherein the eliminating false positive detections of the ball comprises eliminating outlier candidates of the ball, and leaving remaining ball candidates to which the fitting occurs, and wherein eliminating outlier candidates of the ball comprises eliminating ball candidates that do not have an appropriate sequential change in size of a circle fitted to a perimeter of found ball candidates.

* * * * *